United States Patent [19]
Nishioka

[11] Patent Number: 4,767,495
[45] Date of Patent: Aug. 30, 1988

[54] METHOD FOR DETECTING TIME FOR TERMINATION OF SURFACE LAYER REMOVAL PROCESSING

[75] Inventor: Kentaro Nishioka, Hikone, Japan

[73] Assignee: Dainippon Screen Mfg. Co., Ltd., Kyoto, Japan

[21] Appl. No.: 130,472

[22] Filed: Dec. 9, 1987

[30] Foreign Application Priority Data

Dec. 10, 1986 [JP] Japan ................. 61-294205

[51] Int. Cl.$^4$ ............ H01L 21/306; B44C 1/22; C03C 15/00; C03C 25/06
[52] U.S. Cl. .................. 156/626; 156/643; 156/646; 156/653; 156/657; 156/659.1; 156/345; 204/192.37; 204/298
[58] Field of Search ............... 156/626, 627, 643, 646, 156/653, 657, 659.1, 345; 204/192.37, 298; 437/8, 228; 356/381, 382, 437, 445; 427/38, 39

[56] References Cited

U.S. PATENT DOCUMENTS 4,454,001 6/1984 Sternheim .................. 156/626
4,496,425 1/1985 Kuyel ....................... 156/626
4,569,717 2/1986 Ohgami et al. .............. 156/626
4,660,979 4/1987 Muething .................... 356/357

FOREIGN PATENT DOCUMENTS 60-192338 9/1985 Japan .

Primary Examiner—William A. Powell
Attorney, Agent, or Firm—Lowe, Price, Leblanc, Becker & Shur

[57] ABSTRACT

A silicon oxide layer is provided on the surface of a semiconductor substrate. Light is applied to the silicon oxide layer while the silicon oxide layer is removed by etching. Intensity of reflected light is detected to obtain an intensity detection signal. The time that would be required for a decrease in thickness of the silicon oxide layer through etching by half of the wavelength of the light is previously obtained to define a reference time period. Within the intensity detection signal, a component periodically changed with a cycle time period equal to the reference time period is extracted. On the basis of the time change of the value of the component, a termination time of silicon oxide layer removal processing is detected.

9 Claims, 15 Drawing Sheets

FIG. 1 (PRIOR ART)
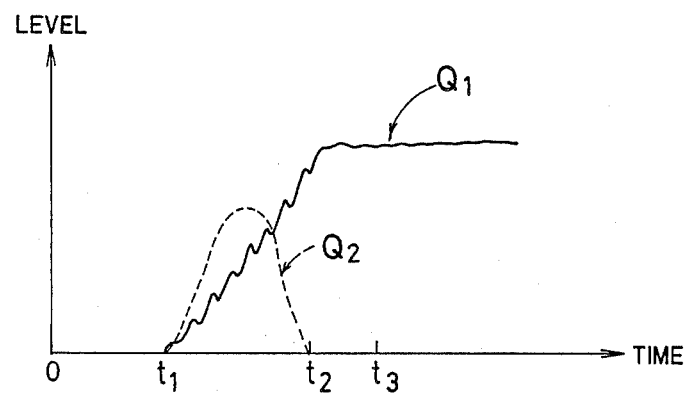
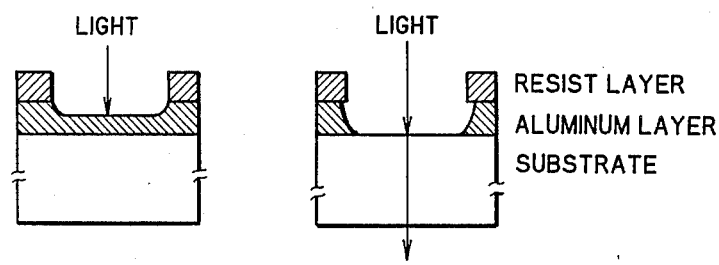

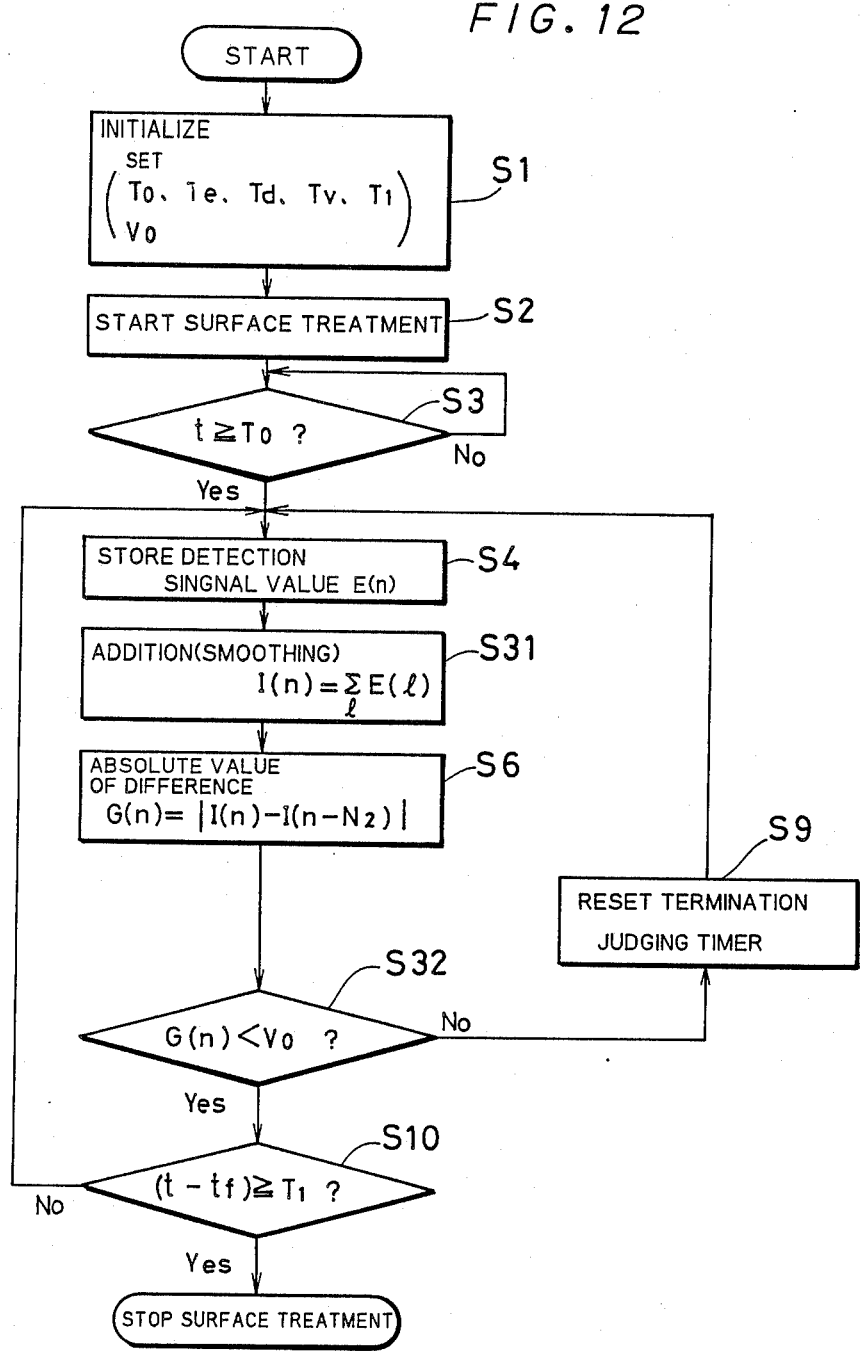

METHOD FOR DETECTING TIME FOR TERMINATION OF SURFACE LAYER REMOVAL PROCESSING

BACKGROUND OF THE INVENTION

1. Field of the Invention

The present invention relates to a method of detecting a termination time of a surface layer removal process for removing a surface layer formed on a substrate thus is useful for etching of a semiconductor substrate or a substrate for a liquid crystal device (hereinafter referred to as "wafer").

2. Description of the Prior Art

In an etching step for manufacturing a semiconductor device, for example, it is necessary to correctly detect a termination time at which etching of a desired region of a semiconductor wafer is terminated thereby to remove the wafer from an etching solution etc. This is because side etching to peripheral regions etc. is inevitably increased if the wafer is dipped in the etching solution or the etching solution is sprayed onto the wafer surface over a required time. Well-known examples of conventional termination detecting methods are as follows:

In a first method, an infrared projector and a light receiver are provided on both sides of a wafer. Output $Q_1$ (FIG. 1) of the light receiver is processed by a logarithmic amplifier, a peak value detecting circuit, a filter circuit and a differentiating circuit (all not shown) to become a signal $Q_2$. Then, any time change of the signal $Q_2$ is observed.

It is assumed that the signal $Q_2$ rises at a time $t_1$ and then falls at a time $t_2$ upon removal of an aluminum layer on a surface through progress of etching. In this case, a time $t_3$ after lapse of a time period proportional to $(t_2-t_1)$ from the point $t_2$ is detected as an etching termination time.

In a second method, a value obtained by smoothing (averaging) a difference value of output $Q_1$ from a light receiver by a prescribed time constant is employed as an index for processing termination detection in optical system arrangement similar to the above. Approach of the time to terminate etching is recognized by detecting a drop in the index.

In a third method, an initial value of a light receiving output at an etching starting time is stored. A particular moment of time after a lapse of a prescribed time period from an origination of a level change of the light receiver output from the initial value is assumed to be a processing termination time.

Although these methods have their own respective characteristics, all of the same are applicable only to the case of etching a surface layer, such as an aluminum layer, which transmits no light. This is because no rise of light receiver output upon termination of etching occurs when etching a light-transmissible surface layer.

A fourth method, which is disclosed in PCT/US83/00655, relates to a termination detection technique for an etching material having light transmissibility in a specific wavelength band. In this method, a region substantially larger than that of an etched portion is subjected to light irradiaion. Then, obtained is an optical interference signal of light surface-reflected by the etching layer as etching progresses, with light transmitted through the etching layer and reflected by the surface layer of a supporting substrate. Secondary and tertiary time differentiations are performed on the signal. Etching is stopped upon lapse of a time period from a reference time at which both of the differentiation signals are substantially zeroed, this time period is substantially equal to or is twice as much as a time up to the reference time.

In this method, however, a problem is caused when surface treatment is performed by spraying a surface treating solution from a nozzle to the surface of a wafer while rotating the wafer. In the case of such a processing system, a slight time change may be recognized in sensor output even if etching is completed. The sensor output is not converged to zero in such a case. Thus, the fourth method cannot be applied to that case since the same is based on the premise that the sensor output is converged to zero.

SUMMARY OF THE INVENTION

The present invention is directed to a method of detecting a termination time or end point of surface layer removal processing for removing a surface layer provided on a substrate of an object to be processed. According to the present invention, previously found are a wavelength of light transmissible through the surface layer and a reference time period required for a decrease in thickness of the surface layer by one-half the wavelength as a result of surface layer removal processing.

Light is applied to the object during surface layer removal processing, while intensity of light reflected from the object or light transmitted through the object is detected to generate an intensity detection signal. In order to detect the termination time on the basis of the intensity detection signal, the present invention comprises the steps of: obtaining first data expressing a time change of the intensity detection signal; obtaining a time difference value of the first data for each time interval proportional to the reference time period to extract a component of the first data which changes periodically with a cycle time period proportional to the reference time period from the first data; obtaining second data expressing a time change of the time difference value; and comparing a value of the second data with a prescribed threshold value to detect the time for termination on the basis of a moment in time time at which a relationship in magnitudes between the value of the second data and the threshold value becomes inverted.

When, for example, the time change of the intensity detection signal for the reflected light from the object is as shown in FIG. 8A, the first data is obtained as shown in FIG. 8C. The time change of the difference value of the first data is as shown in FIG. 8D. In a preferred embodiment of the present invention, the waveform of FIG. 8D is smoothed to obtain second data as shown in FIG. 8E. A moment of time for termination $t_e$ is specified on the basis of a moment of time $t_f$ at which the value of the second data is less than a threshold value $v_0$.

The present invention also provides an apparatus for detecting a termination time of surface layer removal processing for removing a surface layer provided on a substrate of an object to be processed. The apparatus comprises: light irradiation means for applying light transmissble through the surface layer onto the object; light receiving means for receiving reflected light on the object or transmitted light through the object to generate an electric signal; first smoothing means for smoothing the electric signal from the light receiving means in time by a first time constant thereby to generate first data; difference operating means for obtaining a time difference value for each prescribed time interval of the first data, which the time interval has a value that is proportional to a ratio of the speed of the surface layer removal processing to the wavelength of the light; time change finding means for finding a time change of the difference value; second smoothing means for smoothing the difference value in time by a second time constant thereby to generate second data; comparing means for comparing a value of the second data with a prescribed threshold value; and termination time specifying means for detecting a moment of time at which a large/small relation between the value of the second data and the threshold value is inverted to specify the termination time on the basis of the moment of time at which the relationship of magnitudes of the second data and threshold values invert.

Accordingly, a first object of the present invention is to provide a surface layer removal processing termination detecting method and an apparatus therefor, which can correctly detect the time for termination of a process for removing a light transmissible surface layer provided on a substrate.

A second object of the present invention is to provide a surface layer removal processing termination detecting method and an apparatus therefor, which can correctly detect a time for termination of removal processing in a case wherein light detection tends to be instabilized by spraying a surface treating solution on, or mechanical vibration/rotation of, a processed object.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an explanatory diagram of a conventional processing termination detecting method;

FIG. 12 is a flow chart showing the operation of a third embodiment of the present invention;

DESCRIPTION OF THE PREFERRED EMBODIMENTS

A. Structure of Apparatus

Figure 2:
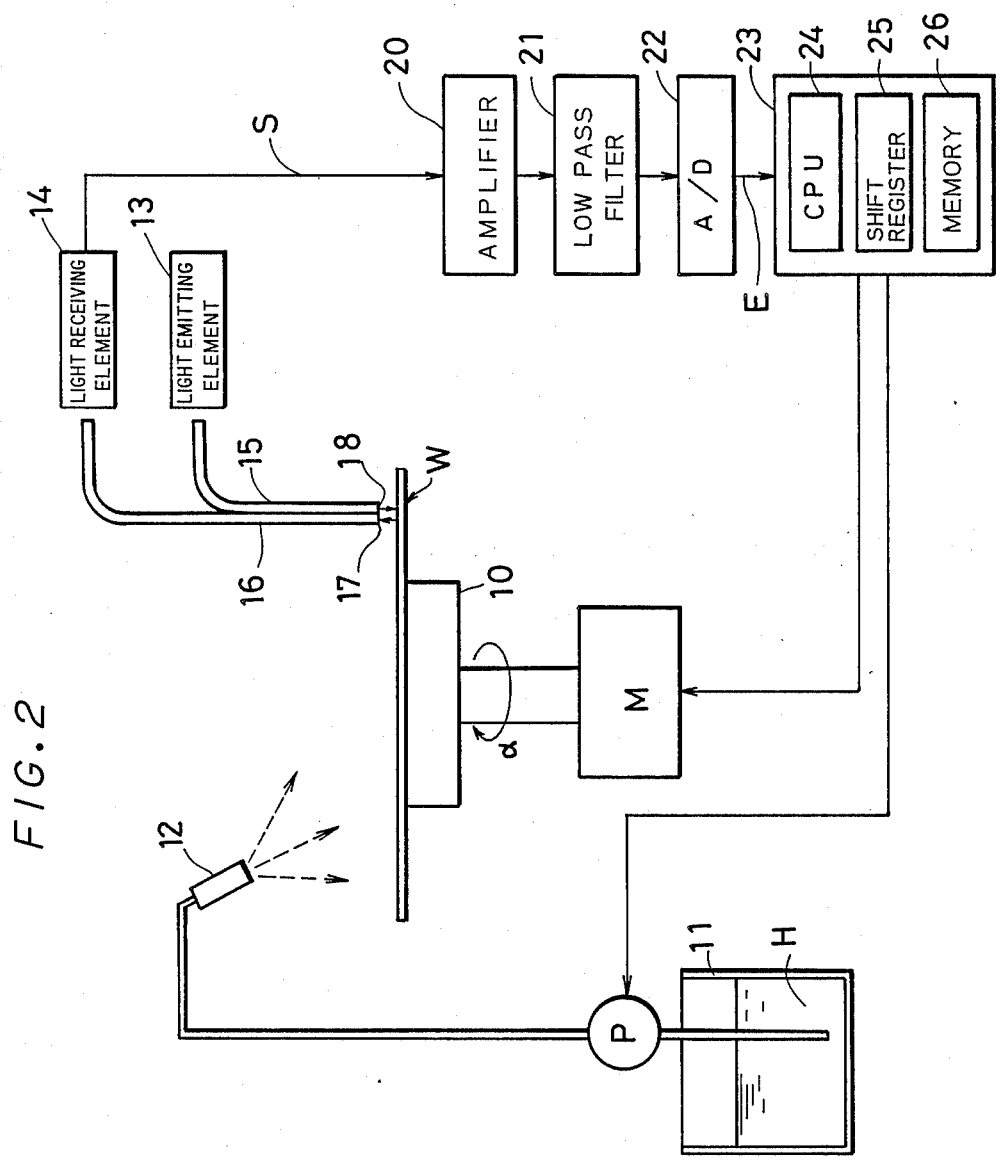
FIG. 2 is a block diagram showing an apparatus employed in embodiments of the present invention.

FIG. 2 is a block diagram showing the structure of an apparatus employed for each embodiment of the present invention. The apparatus shown in FIG. 2 is formed as an etching apparatus for a semiconductor wafer W. The following description is made with reference to surface layer removal processing termination detection in etching of the wafer W.

Figure 3A:
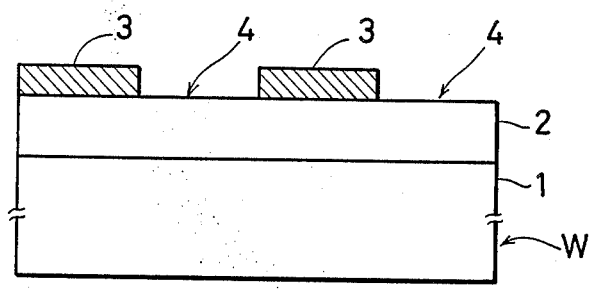
FIG. 3 to FIG. 6 are diagrams illustrating principles of the embodiments.

As shown in FIG. 3A as an enlarged sectional view, the wafer W is provided on one major surface of a silicon substrate 1, which serves as a base substrate, with a silicon oxide layer 2 serving as a surface layer. A resist layer 3 having a desired pattern is selectively formed on the surface of the silicon oxide layer 2 through a well-known photoresist film forming step. The apparatus as shown in FIG. 2 performs removal processing of the silicon oxide layer 2 with respect to etching regions 4 provided with no resist layer 3 on the upper surfaces thereof.

Referring again to FIG. 2, the wafer W of such a structure is chucked on a spin chuck 10, and a motor M is rotated to horizontally rotate the wafer W in a direction shown by arrow α in FIG. 2. On the other hand, an etchant H prepared in a tank 11 is drawn by a pump P, to be sprayed onto the surface of the wafer W through a nozzle 12. The etchant H includes an aqueous solution of hydrofluoric acid and ammonium fluoride, for example. Thus, the silicon oxide layer 2 of FIG. 3A is gradually etched by continuously spraying the etchant H while rotating the wafer W.

The apparatus as shown in FIG. 2 includes a light emitting element 13 and a light receiving element 14. The light emitting element 13 is formed by a light emitting diode etc., and light from the light emitting element 13 is irradiated on the upper surface of the wafer W through an optical fiber member 15 for light application. The diameter of the irradiation spot is so sized as to simultaneously irradiate both of the etching regions 4 and the resist layer 3 surrounding the same.

The light emitting element 13 is prepared by an element for generating light containing a wavelength component which can be transmitted through the silicon oxide layer 2. Since a silicon oxide layer transmits infrared light, as is well known in the art, the light emitting element 13 may be prepared by an element which generates monochromatic coherent light having a wavelength of $\lambda_0 = 940$ nm or narrow-band light including the wavelength $\lambda_0$.

Figure 3B:
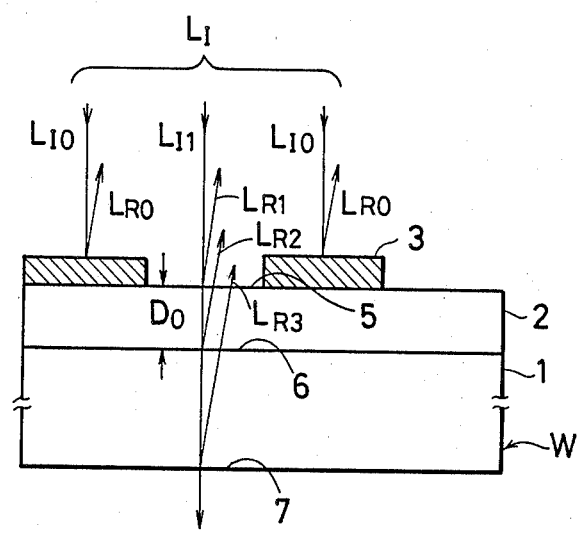

Irradiation light $L_I$ containing a component having such wavelength $\lambda_0$ is applied to the surface of the wafer W, as shown in FIG. 3B. Within this, light $L_{I0}$ applied to the upper surface of the resist layer 3 is partially absorbed by the resist layer 3, to remain as reflected light $L_{R0}$. Most of the light $L_{I1}$ applied to the etching regions 4 is transmitted through the silicon oxide layer 2 and further through the silicon substrate 1 toward the exterior of the wafer W. This is because the silicon substrate 1 is also transparent to infrared light of the aforementioned wavelength. Although various types of reflected light are present in addition to that shown in FIG. 3B, the one shown is the principal reflected light. It may be considered that the shown light is obtained by composing various types of reflected light.

However, not all of the irradiation light $L_{I1}$ passes through the wafer W, but the same is reflected to some extent by an upper surface 5 of the silicon oxide layer 2, an interface 6 between the silicon oxide layer 2 and the silicon substrate 1 and a lower surface 7 of the silicon substrate. Parts of reflected light $L_R$, $L_{R2}$ and $L_{R3}$ reflected by these surfaces respectively to return to the atmosphere on the silicon oxide film 2, enter a light receiving optical fiber member 16, as shown in FIG. 2, with part of the reflected light $L_{R0}$ from the resist layer 3. A light receiving end 17 of the light receiving optical fiber member 16 and a light applying end 18 of the light applying optical fiber member 15 are provided in positions close to the surface of the wafer W opposite the wafer W. Therefore, reflected light $L_R$ generated by the aforementioned reflection, i.e.,:

$$L_R = k(L_{R0} + L_{R1} + L_{R2} + L_{R3}) \quad (1)$$

is guided to the light receiving element 14 through the light receiving optical fiber member 16. Symbol k represents a constant ($0 < k < 1$) determined by the size and position of the light receiving end 18.

A light receiving electric signal S outputted from the light receiving element (photoelectric converter) 14 has a level which is proportional to intensity of the received reflected light $L_R$. The light receiving signal S is amplified by an amplifier 20, to be A-D converted by an A-D converter 22 through low pass filter 21. A detection signal E obtained by such A-D conversion is supplied to a controller 23 including a CPU 24, a shift register 25 and a memory 26 etc. The controller 23 is adapted to supply driving control signals for the aforementioned motor M and pump P.

B. Property of Light Receiving Signal S

Description is now made on the property of the light receiving signal S. First, it is noted that the reflected light $L_R$ is expressed by the expression (1), as hereinabove described with reference to FIG. 3A. Within the terms in the right side of the expression (1), reflected light $kL_{R1}$ is separated from an other portion of light, which is represented by $kL_{RA}$. Namely, $$L_R = k(L_{R1} + L_{RA}) \quad (2)$$

$$L_{RA} = L_{R0} + L_{R2} + L_{R3} \quad (3)$$

Then, the reflected light $L_R$ is an interference waveform by composition of first reflected light $L_{R1}$ and second reflected light $L_{RA}$, while phase difference between the two types of reflected light $L_{R1}$ and $L_{RA}$ is changed as etching progresses. This is because optical path length of the first reflected light $L_{R1}$ is changed as etching progresses while that of the second reflected light $L_{RA}$ has no relation to etching progress.

Figure 3C:
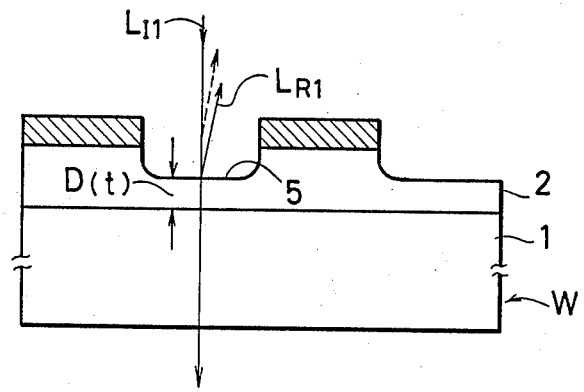

Thus, as etching progresses to the state as shown in FIG. 3C, the light path length of the second reflected light $L_{R1}$ is increased, in reflection perpendicular to the major surface of the wafer W, by:

$$2(D_0 - D(t))$$

where $D_0$ represents thickness of the silicon oxide layer 2 before etching, and $D(t)$ represents thickness at an arbitrary time t after starting of etching. In approximation of the etching rate by a constant value r, the thickness $D(t)$ can be expressed as follows:

$$D(t) = D_0 - rt \quad (4)$$

Figure 4A:
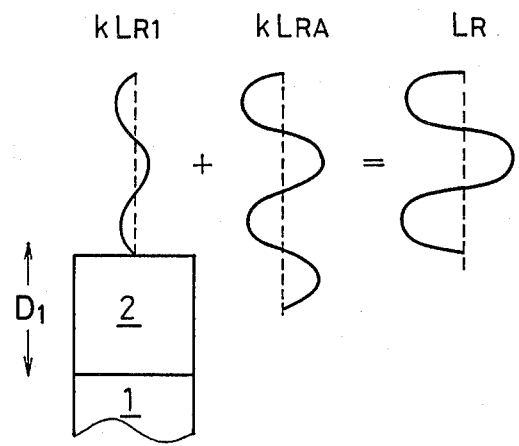
Figure 4B:
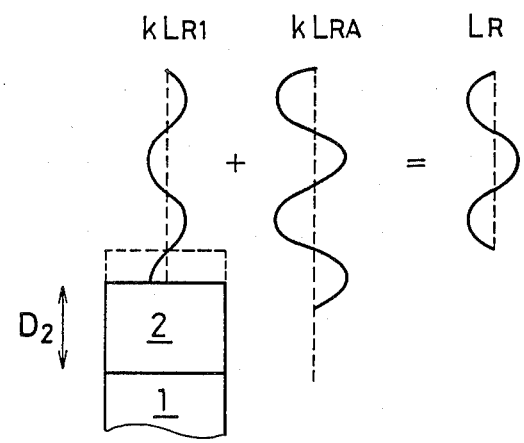
Figure 5:
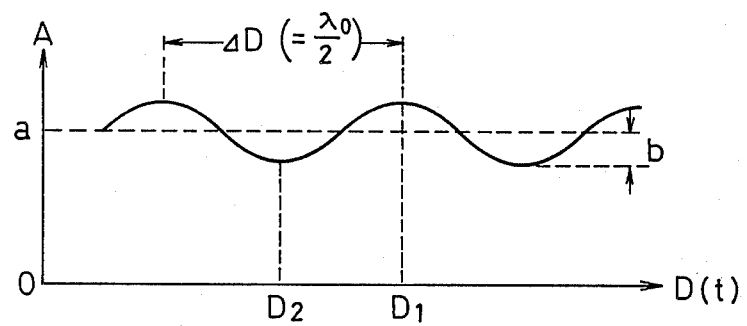

Therefore, with respect to such thickness $D(t) = D_1$, where first reflected light $kL_{R1}$ is in phase with second reflected light $kL_{RA}$, as shown in FIG. 4(a), for example, the first reflected light $L_{R1}$ interferes with the second reflected light $L_{RA}$ to intensify each other, whereby the reflected light $L_R$ is increased in amplitude. Further, with respect to such thickness $D(t) = D_2$, where the first reflected light $kL_{R1}$ is out of phase by $N_I \pi$ radian ($N_I$ = odd integer) with the second reflected light $kL_{RA}$, as shown in FIG. 4(b), the first reflected light $kL_{R1}$ and the second reflected light $kL_{R1}$ weaken each other, whereby the reflected light $L_R$ is decreased in amplitude. Thus, the relation between the thickness $D(t)$ of the silicon oxide layer 2 and the amplitude A of the reflected light $L_R$ is an oscillatory waveform as etching progresses, as shown in FIG. 5. The period $\Delta D$ of the oscillation is $\frac{1}{2}$ that of the wavelength $\lambda_0$ of the irradiation light $L_I$ (i.e., the wavelength of reflected light $L_R$).

As is well known, intensity of light is proportional to the square of its amplitude. Thus, the level of the light receiving signal S obtained by the light receiving element 14 is proportional to the square of the amplitude A of FIG. 5. Consequently, $$S \alpha A^2 \quad (5)$$

On the other hand, the amplitude A is related to the thickness $D(t)$ by the relation as shown in FIG. 5, which thickness $D(t)$ is expressed by the expression (4). As a result, the following expressions (6) and (7) are obtained:

$$\begin{aligned}
S \propto A^2 &= \{a + b \cdot \sin(4\pi D(t)/\lambda_0 + \theta)\}^2 \\
&= a^2 + 2ab \cdot \sin(4\pi D(t)/\lambda_0 + \theta) + \\
&\quad b^2\{1 - \cos(8\pi D(t)/\lambda_0 + 2\theta)\}/2 \\
&= a^2 - 2ab \cdot \sin(4\pi rt/\lambda_0 - e) + \\
&\quad b^2 \cdot \{1 - \cos(8\pi rt/\lambda_0 - 2e)\}/2
\end{aligned} \quad (6)$$

$$e \equiv \theta - 4\pi D_0/\lambda_0 \quad (7)$$

where a, b and $\theta$ are constants independent of the etching rate r, while a and b represent the level of oscillation center and the amplitude of the amplitude A itself, respectively.

While the oscillation state of the expression (6) is varied with the large/small relation between the constants a and b, it is assumed that $a \gg b$ for the purpose of simplification. Then, the third term of the final side in the expression (6) can be omitted, to obtain the following expression (8):

$$S \alpha a^2 - 2ab \cdot \sin(4\pi rt/\lambda_0 - e) \quad (8)$$

As is obvious from the expression (8), the level of the light receiving signal S oscillates periodically in time with a time period (reference time period) T which is proportional to the ratio of the wavelength $\lambda_0$ to the surface layer removal processing progress speed r. In other words, the reference time period T corresponds to a time in which decrease in thickness of the silicon oxide layer 2 progresses by $\frac{1}{2}$ of the wavelength $\lambda_0$ through etching.

$$T = \lambda_0/(2r) \quad (9)$$

Figure 6A:
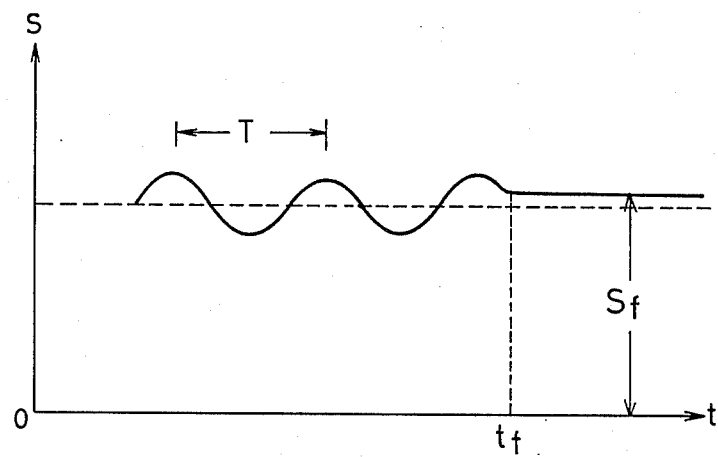

As a result, the light receiving signal S oscillates as shown in FIG. 6A with a lapse of time t. After a time $t_f$, when the thickness $D(t)$ of the silicon oxide layer 2 is zeroed to terminate etching, the level of the signal S is stopped with a final value $S_f$ obtained by zeroing $D(t)$ in the expression (6). The final value $S_f$ is given by the following expression (10):

$$S_f = a^2 + 2ab \cdot \sin\theta + b^2\{1 - \cos(2\theta)\}/2 \tag{10}$$

Figure 6B:
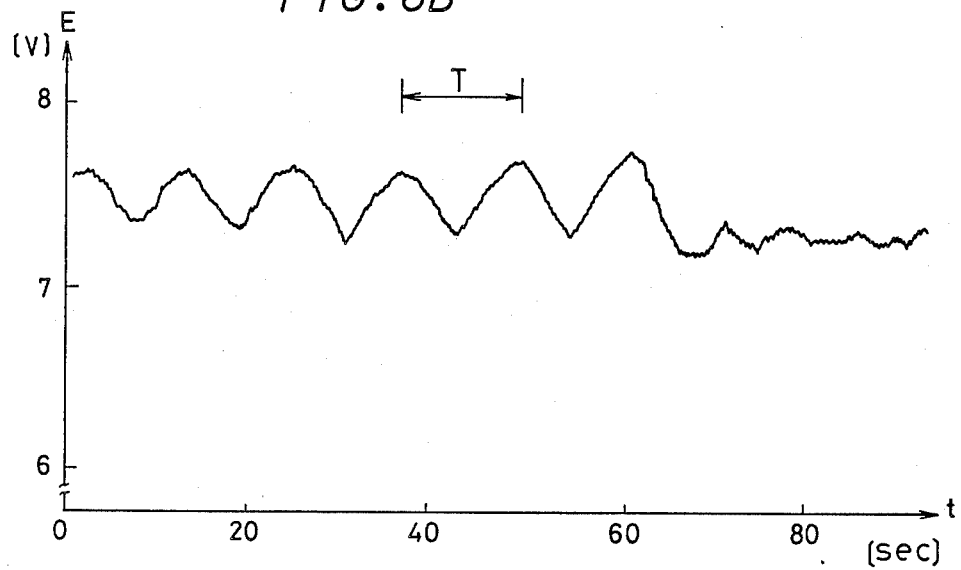

Through the aforementioned analysis, it is understood that the oscillation component having the reference time period T as the cycle time period can be extracted from the light receiving signal S of FIG. 6A to perform processing termination detection on the basis of the time $t_f$ when the component is lowered. However, a waveform of FIG. 6A is, after all, obtained by theoretical approximation, and in practice, a detection signal E obtained by smoothing the light receiving signal S also includes a complicated noise component as shown in FIG. 6B. Such noise is caused by rotation of the wafer W, mist of the etchant, nonuniformity in pattern of the resist layer 3, etc. Thus, required is a method for correctly extracting the oscillation component having the reference time period T as a cycle time period.

Embodiments of the present invention are adapted to improve such extraction processing, and the following description is made with reference to surface layer removal processing termination detecting operation which is responsive to such circumstances.

C. Operation of First Embodiment

Figure 7:
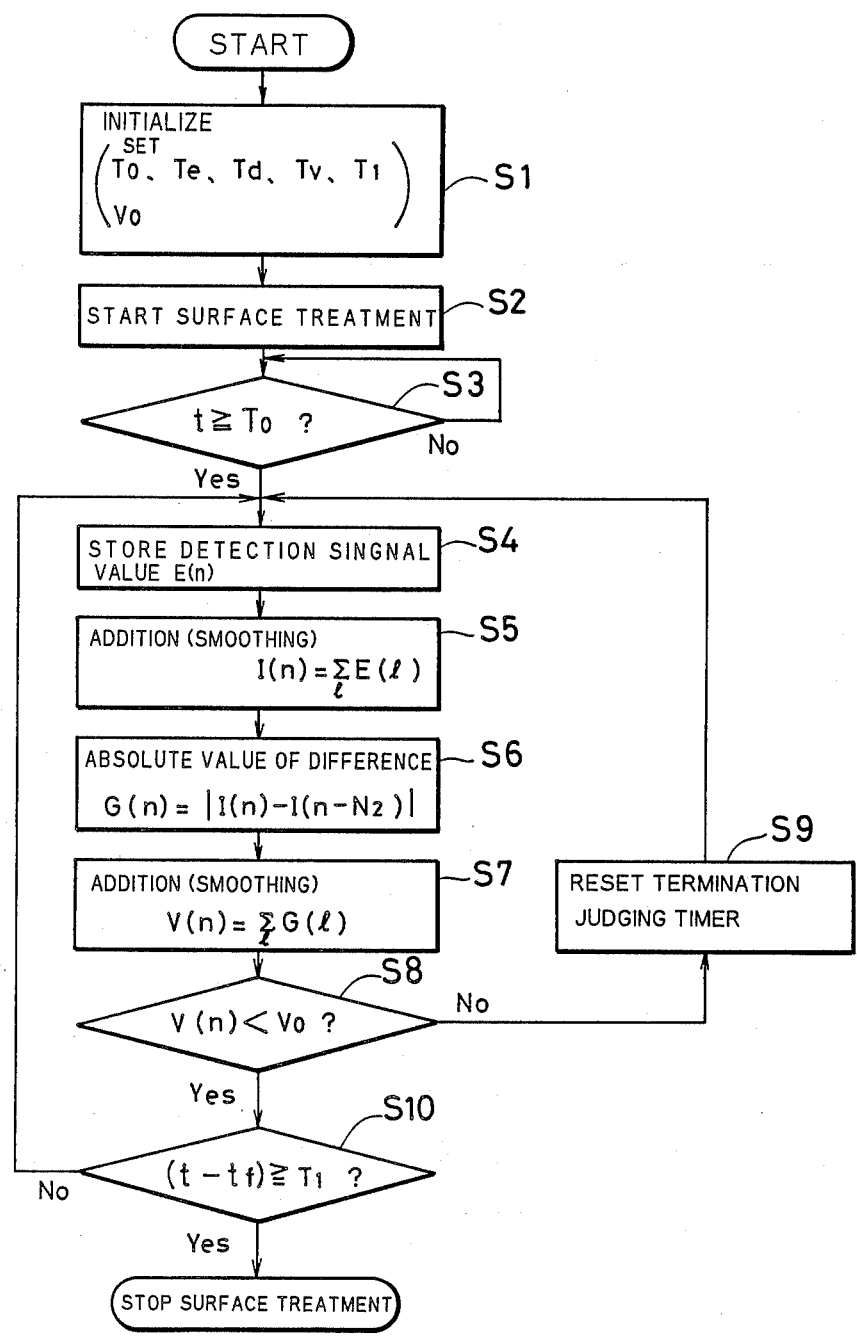
FIG. 7 is a flow chart showing the operation of a first embodiment of the present invention.

FIG. 7 is a flow chart showing the operation of a first embodiment of the present invention, the processing of which is executed on the basis of operation of the CPU 24. At a step S1, the CPU 24 sets various constants required for the processing as hereinafter described, to perform initialization. The constants, which are previously stored in the memory 26, are as follows, and their meanings are hereinafter described.

Figure 8A:
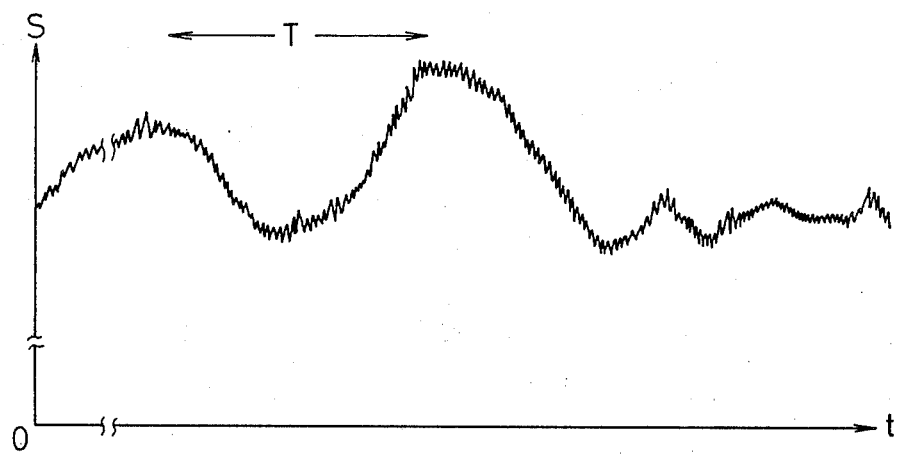
FIG. 8 is a waveform diagram of the first embodiment.

(1) initial detection inhibiting period $T_0$
(2) detection signal adding time interval (first time constant) $T_e$
(3) difference time interval $T_d$
(4) difference adding time interval (second time constant) $T_V$
(5) termination judging time period $T_1$
(6) comparative threshold value $V_0$ At a step S2, the CPU 24 supplies driving control signals to the motor M and the pump P, to start driving of the same. Consequently, rotation of the wafer W and spraying of the etchant H from the nozzle 12 are started. At this time, an initial period counting timer (not shown) contained in the controller 23 starts counting of t. The initial detection inhibiting period $T_0$ is preset in the timer, so that no advance is made to the subsequent processing routine until a lapse of the interval $T_0$ (step S3). This is because a malfunction may be caused if end point detecting operation is performed immediately after the start of surface treatment, since the light receiving signal S is as yet unstable. FIG. 8A shows a part of the light receiving signal S.

Figure 8B:
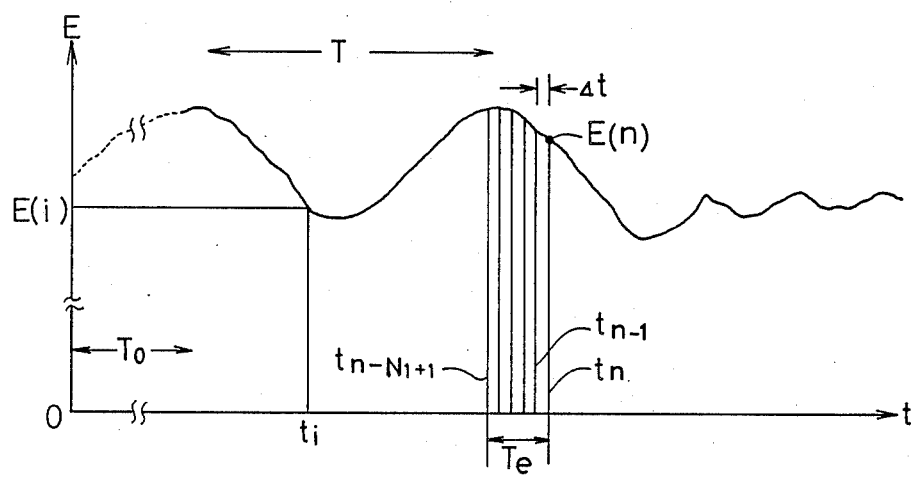
Figure 8C:
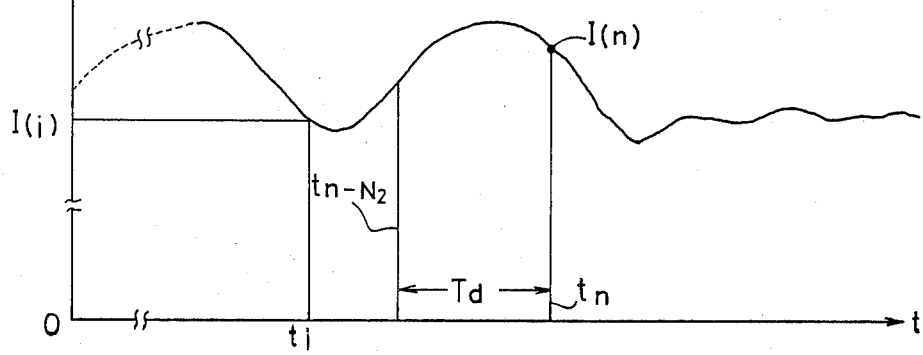

After a lapse of the initial detection inhibiting period $T_0$, the process is advanced to step S4, to perform the following processing cycle each time a sampling time interval $\Delta t$ (e.g., 0.1 sec.) is lapsed. At the step S4, the level value (FIG. 8B) of the detection signal E at the present time is sampled and stored in the shift register 25 (FIG. 2).

The following description is made on the assumption that storage of a certain number of data is already performed. The quantity corresponding to data obtained at a time $t_i = i\Delta t$ is expressed as E(i), for example.

At a subsequent step S5 of FIG. 7, the CPU 24 reads out, within detection signal values E(i) (i=0, 1, ..., n) currently stored in the shift register 25, detection signal values up to that by $N_1$ ahead of the newest detection signal value E(n):

$$E(n) \sim E(n - N_1 + 1)$$

where $N_1$, which is equal to 5, for example, is provided by the following expression (11):

$$N_1 = T_e \Delta t \tag{11}$$

The detection signal values E(n) to $E(n - N_1 + 1)$ are added as in the following expression (12), to obtain first smoothed data value I(n) corresponding to a smoothed value of E(i):

$$I(n) = \sum_{l=n-N_1+1}^{n} E(l) \tag{12}$$

FIG. 8 shows linkage of first smoothed data values I(i) obtained from the expression (12) at each processing cycle.

At a subsequent step S6, the absolute value (hereinafter referred to as "difference absolute value" or "absolute value of difference") G(n) of a difference value F(n) between the current first smoothed data value I(n) and a previous first smoothed data value $I(n - N_2)$, older by $T_d$, is obtained as follows:

$$\begin{aligned} G(n) &= |F(n)| \\ &= |I(n) - I(n - N_2)| \end{aligned} \tag{13}$$

$$N_2 = T_d/\Delta t \tag{14}$$

The difference time interval $T_d$ is determined from the aforementioned reference time period T in accordance with a predetermined rule. While the reference time period T is expressed by the expression (9), for example, the same is generally defined as an oscillation period depending on the processing progress speed r and the wavelength $\lambda_0$, and is not necessarily expressed by a simple expression such as that of (9).

It is most preferable to determine the difference time interval $T_d$ as ½ of the reference time period T. This can be explained as follows: With respect to an oscillation component having an angular frequency $\omega$, a difference value J with the difference time interval $T_d$ is obtained as follows:

$$\begin{aligned} J &= \sin\{\omega(t + T_d) + \theta\} - \sin(\omega t + \theta) \\ &= 2\sin(\omega T_d/2)\cos(\omega t + \theta + \omega T_d/2) \end{aligned} \tag{15}$$

The amplitude $J_0$ of the difference value J is:

$$|2\sin(\omega T_d/2)|$$

The amplitude $J_0$ is at the maximum value "2" when:

$$\omega T_d/2 = \pi/2 \tag{16}$$

When the angular frequency $\omega$ is in the relation:

$$\omega = 2\pi/T \tag{17}$$

to the reference time period T, $$T_d = T/2 \quad (18)$$

is obtained by the expression (16). Namely, if the difference value with the difference time interval in half of the reference time period T is obtained, the difference value is that most properly extracting the oscillation component having the reference time period T.

Figure 9:
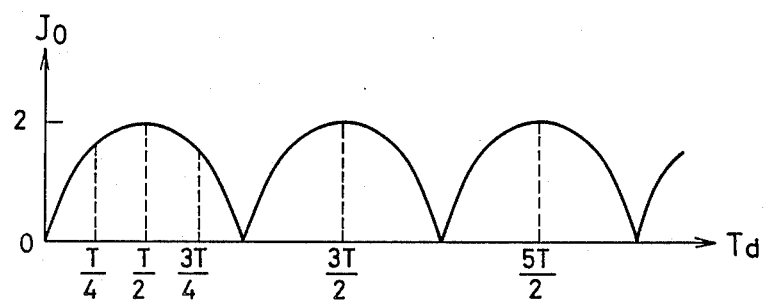
FIG. 9 is a diagram showing the principle of the first embodiment.

However, the difference time interval $T_d$ may have a value other than that of the expression (18). In other words, a time interval proportional to the reference time period T is employed as the difference time interval $T_d$. Since relation between the difference time interval $T_d$ and the amplitude $J_0$ of the difference value F is as shown in FIG. 9 in general, a value within a range of $(\frac{1}{4})T$ to $(\frac{3}{4})T$ as a value in proximity to $(\frac{1}{2})T$ is preferably selected for the difference time interval $T_d$. Assuming that M represents an arbitrary integer, the oscillation component of the period T is properly extracted also in the case of:

$$T_d = (2M + \frac{1}{2}) T \quad (19)$$

However, since the response is delayed if the difference time interval $T_d$ is increased excessively, it is most preferable to determine the difference time interval $T_d$ as in the expression (18). The value of the surface layer removal processing progress speed (etching rate) r can be previously found by previously measuring the same using a dummy wafer etc.

Figure 8D:
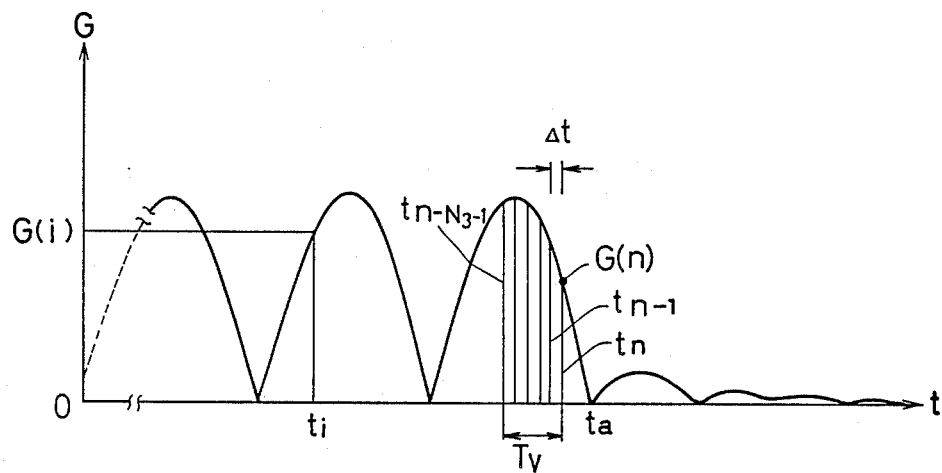
Figure 8E:
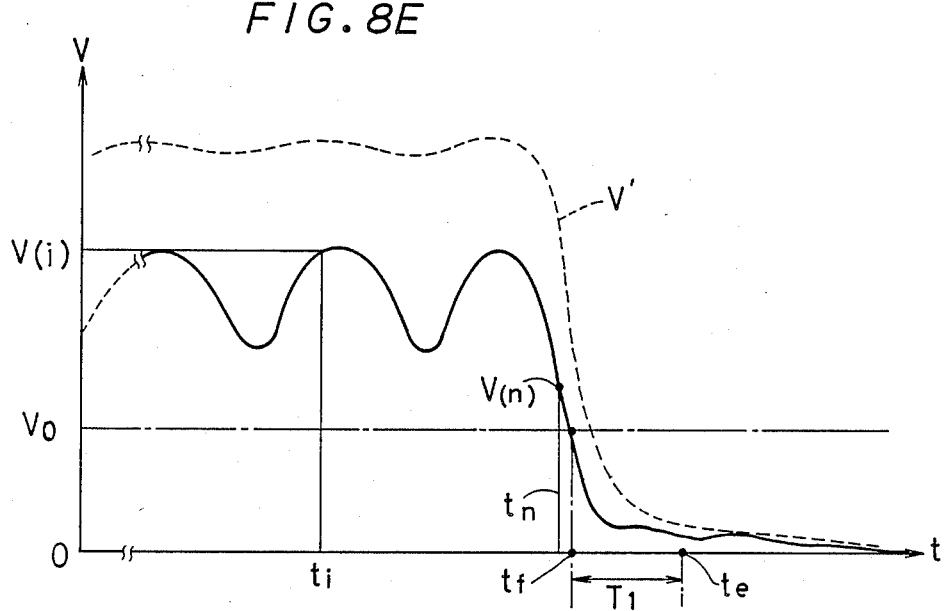

The waveform as shown in FIG. 8D can be obtained by finding the time change of the difference absolute value G(i) thus obtained. As is obvious from FIG. 8D, the level of the difference absolute value G(i) after a moment of time $t_a$ at which etching is substantially completed is approximate zero.

At a subsequent step S7, the sum of difference absolute values G(n) to $G(n-N_3+1)$ by $N_3$ from the newest value G(n) is obtained with respect to the difference absolute value G(i), to obtain second smoothed data value V(n) (FIG. 8E) as follows:

$$V(n) = \sum_{l=n-N_3+1}^{n} G(l) \quad (20)$$

where $N_3$, which is equal to 5, for example, is a value obtained from the difference adding time interval $T_V$ as follows:

$$N_3 = T_V/\Delta t \quad (21)$$

At a step S8, a current newest data value V(n) within the second smoothed data values V(i) thus obtained is compared with the threshold value $V_0$. When the data value V(n) is larger than the threshold value $V_0$, a termination judging timer (not shown) provided in the controller 23 is reset at a step S9, to return to the step S4.

When $V(n) < V_0$, on the other hand, the process is advanced from the step S8 to step S10, to judge whether or not the termination judging time period $T_1$ has lapsed from the inversion point $t_f$ at which V(n) is inverted from being larger to being smaller than $V_0$ by referring to the termination judgement timer. The process is returned to the step S4 if the determination is "NO", while the determination at the step S10 is "YES" when the large/small relation-inverted state of $V(n) < V_0$ is continuous by the termination judging time period $T_1$, whereby this moment of time that establishes the decision "YES" is detected as the termination time $t_e$. The surface layer removal processing termination detecting operation itself is thus completed, and the process is progressed to surface treatment stopping operation. This surface treatment stopping operation includes stopping the pump P, washing the wafer W with demineralized water, dehydration/drying the same etc., although such operation is not described in detail.

Correct processing of end point detection is performed through the aforementioned operation, while eliminating the influence of noise etc. The termination judging time period $T_1$ is set: (1) in order to prevent erroneous recognition of the processing end point when $V(n) < V_0$ is accidentally obtained for a short time period; and (2) in order to provide an excess etching time to some extent for completing etching of a region of the wafer W in the case that etching is not yet completed even if V(n) becomes smaller than $V_0$. While the reference time period T is generally 5 to 10 sec., for example, the second smoothed data value V is changed to that shown by broken line V' in FIG. 8E when the difference adding time interval $T_V$ is set at a large value.

D. Operation of Second Embodiment

Figure 10:
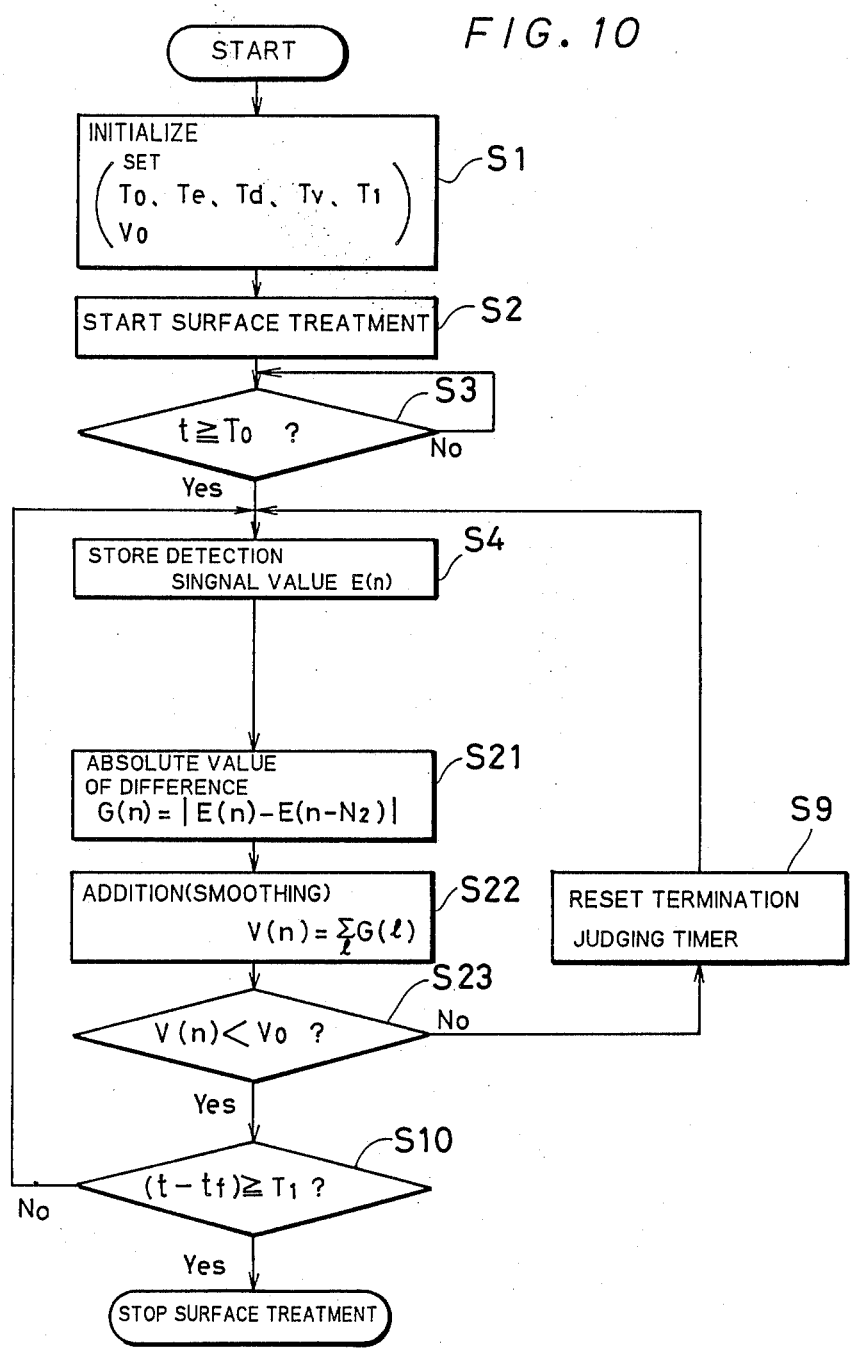
FIG. 10 is a flow chart showing the operation of a second embodiment of the present invention.
Figure 11A:
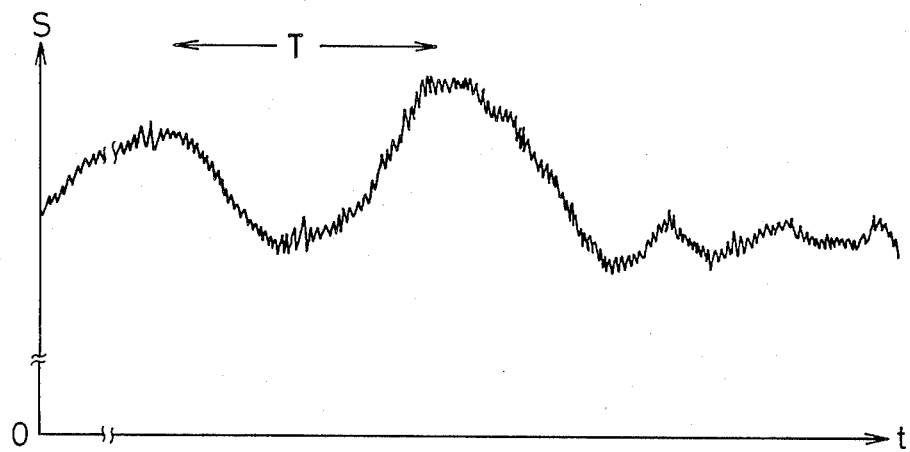
FIG. 11 is a waveform diagram of the second embodiment.
Figure 11B:
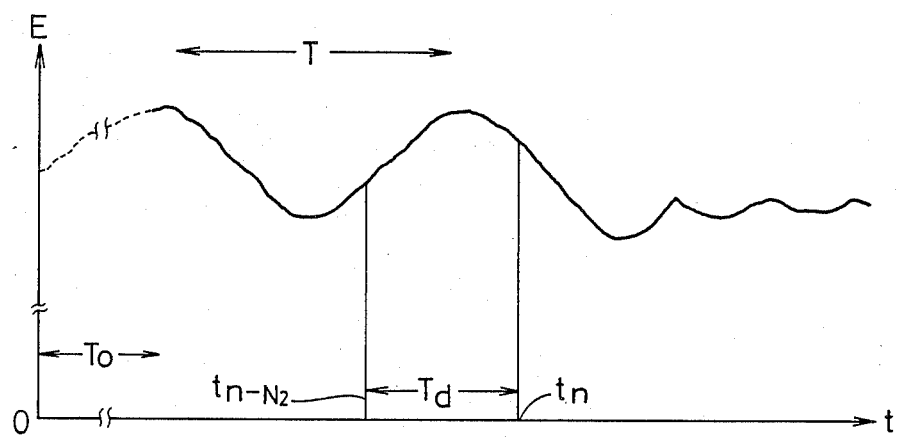
Figure 11C:
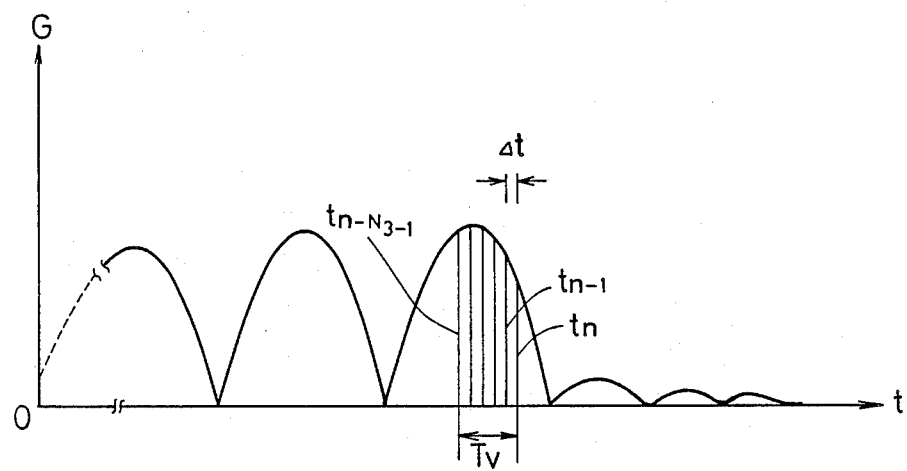
Figure 11D:
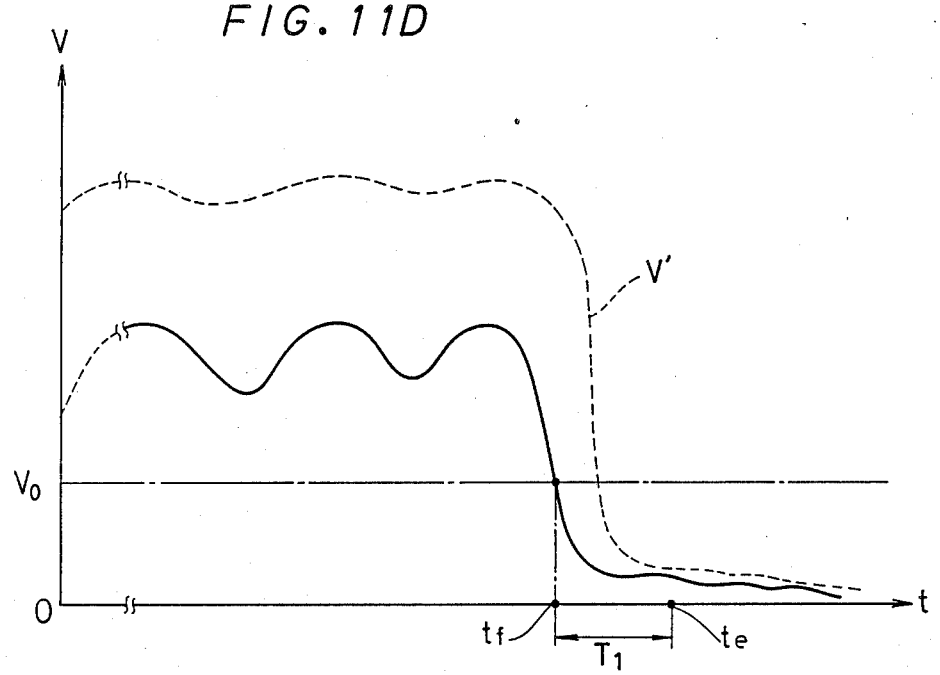

FIG. 10 is a flow chart showing the operation of a second embodiment of the present invention. As is obvious from FIG. 10 compared with FIG. 7, the step S5 of FIG. 7 is omitted and a difference absolute value of a detection signal value E(n) is obtained as a difference absolute value G(n) in the second embodiment (step S21). Namely, the detection signal value E(n) itself is employed as "first data" which is determined in response to a time change of intensity of reflected light $L_R$ in the second embodiment. A smoothed data value V(n) is obtained from the difference absolute value G(n) at step S22, so that the smoothed data value V(n) is compared with a threshold value $V_0$ at a step S23.

FIGS. 11A to 11D show time change of respective data in such case, and it is understood that the termination time $t_e$ also is correctly obtained by this method. When value $T_V$ is increased, smoothed data V(i) undergoes a time change, as shown by broken line V' in FIG. 11D.

E. Third Embodiment

Figure 13:
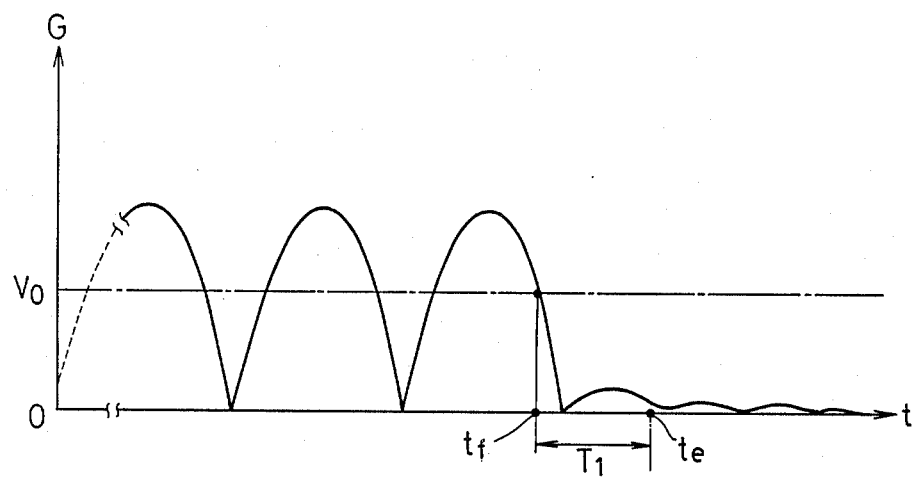
FIG. 13 and FIG. 14 are waveform diagrams showing comparisons carried out in the third embodiment.
Figure 14:
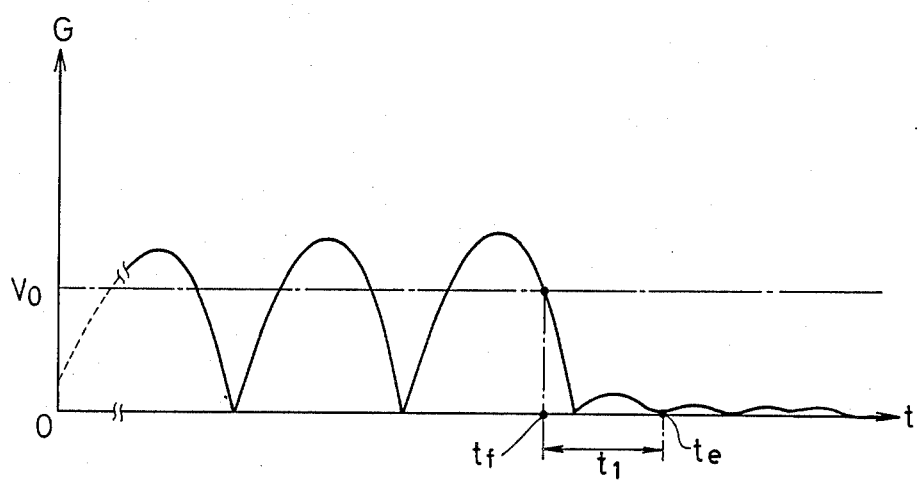

FIG. 12 is a flow chart showing the operation of a third embodiment of the present invention. The step S7 of FIG. 7 is omitted in the third embodiment. A difference absolute value G(n) itself is compared with a threshold value $V_0$ (step S32). Therefore, the waveforms of FIGS. 8A to 8D in the first embodiment are obtained in the third embodiment, and comparison processing as shown in FIG. 13 is performed on the waveform of FIG. 8D. The waveforms of FIGS. 11A to 11C in the second embodiment are obtained when a step S31 (corresponding to the step S5 of FIG. 7) in FIG. 12 is also omitted, and comparison processing as shown in FIG. 14 is performed on the waveform of FIG. 11C.

F. Modifications

Although the reference time period T is theoretically derived as in the expression (9), various errors may be caused in practice and hence the reference time period T may be experimentally obtained to responsively determine the difference time interval $T_d$. Further, it is not a requisite to obtain the difference absolute value, but the difference value F(n) may be compared with a threshold value $\pm V_0$, to specify such a time when $(-V_0)<F(n)<(+V_0)$. An average value may be obtained when smoothing is performed.

Figure 15:
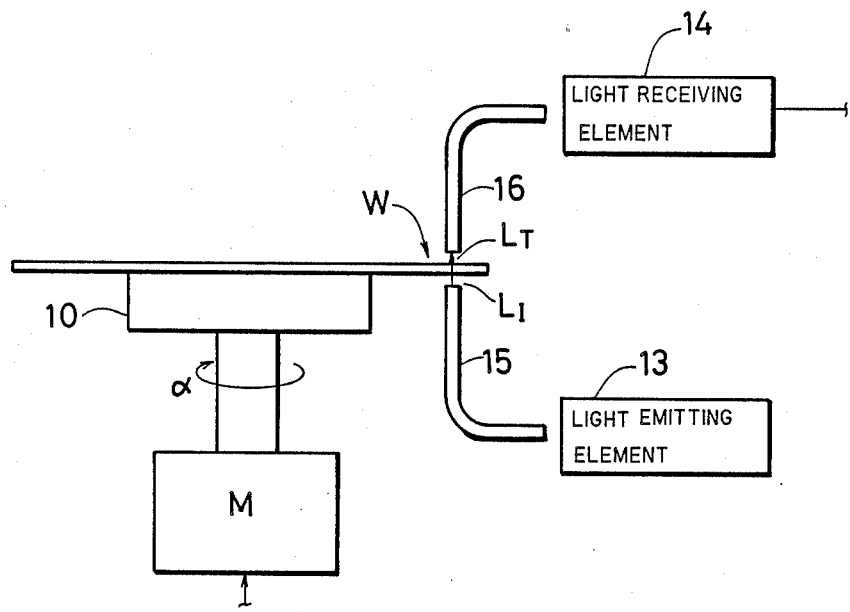
FIG. 15 and FIG. 16 are explanatory diagrams of modifications of the present invention.
Figure 16:
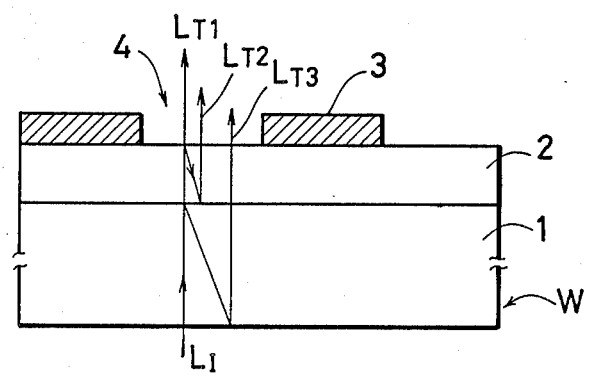

Further, a light emitting element 13 and a light receiving element 14 may be oppositely provided on both sides of a wafer W, as shown in FIG. 15, to detect transmitted light $L_T$. In this case, employed is light which can be transmitted through both a base substrate and a surface layer. Further employed is the fact that a light path difference between two principal types of transmitted light $L_{T1}$ and $L_{T2}$ as shown in FIG. 16, is changed as etching progresses. There are transmitted lights other than the same, such as transmitted light $L_{T3}$ in FIG. 16, similarly to the reflected lights in the first embodiment. Also similarly to the first embodiment, the transmitted light $L_T$ may be considered as light composed of such various types of transmitted lights.

The present invention is applicable to the case of dipping a wafer W in an etchant, in addition to the case of spraying the etchant onto the wafer W.

Further, the present invention is applicable to surface layer removal processing of various objects, such as development in manufacturing of a resist film, in addition to etching processing of a semiconductor wafer.

G. Advantages of the Invention

According to the present invention as hereinabove described, processing for termination detection during etching is performed through a change in the interference state of light due to changes in thickness of the surface layer as etching progresses. Therefore, a termination time of removal processing of a portion existing in a prescribed region of the surface layer provided on a base substrate, which surface layer transmits light, can be correctly detected.

Further, since instability of light detection caused by spraying of a surface treating solution or mechanical vibration/rotation of a processed object is eliminated in the process of extracting a component having a reference period as a cycle period, the termination time of removal processing can be correctly detected in this case as well.

It is very advantageous that such accuracy is secured, particularly when performing removal processing while rotation of a processed object is carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of detecting a termination time for surface layer removal processing to remove a surface layer provided on a base substrate of an object to be processed, said method comprising the steps of:

finding a wavelength of light transmissible through said surface layer;

predetermining a reference time period required for a decrease in thickness of said surface layer by one-half said wavelength through said surface layer removal processing;

applying said light at said wavelength to said object while performing said surface layer removal processing;

detecting the intensity of reflected light from said object or transmitted light through said object to provide an intensity detection signal;

obtaining first data expressing a time change of said intensity detection signal;

obtaining first data expressing a time change of said intensity detection signal;

obtaining a time difference value of said first data for each time interval proportional to said reference time period thereby to extract a component of said first data which changes periodically in a cycle time period proportional to said reference time period;

obtaining second data expressing a time change of said time difference value; and comparing a value of said second data with a prescribed threshold value to detect said termination time on the basis of a moment of time at which a magnitude relationship between said value of said second data and said threshold value is inverted.

2. A method in accordance with claim 1, wherein said time interval for obtaining said time difference value has a value of about one-half of said reference time period.

3. A method in accordance with claim 2, wherein said first data is obtained by smoothing said intensity detection signal in time by a first time constant.

4. A method in accordance with claim 3, wherein said second data is obtained by smoothing an absolute value of said time difference value of said first data in time by a second time constant.

5. A method in accordance with claim 4, wherein said termination time is detected as a moment of time at which continuation of an inverted state of said magnitude relationship for a prescribed time period is completed after inversion of said relationship.

6. A method in accordance with claim 1, wherein said second data is an absolute value of said time difference value of said first data.

7. An apparatus for detecting a termination time for surface layer removal processing to remove a surface layer provided on a base substrate of an object to be processed, said apparatus comprising:

light irradiation means for irradiating light transmissible through said surface layer onto said object;

light receiving means for receiving light reflected by said object or light transmitted through said object to generate an electric signal;

first smoothing means for smoothing said electric signal from said light receiving means in time by a first time constant thereby to generate first data;

difference operating means for obtaining a time difference value for each prescribed time interval of said first data, said time interval having a value proportional to a ratio of a processing progress speed of said surface layer removal processing to a wavelength of said light;

time change finding means for finding a time change of said difference value;

second smoothing means for smoothing said difference value in time by a second time constant thereby to generate second data;

means for establishing a prescribed threshold value;

comparing means for comparing a value of said second data with the prescribed threshold value; and termination specifying means for detecting a moment of time at which a magnitude relationship between said value of said second data and said threshold value is invetrted to specify said termination time on the basis of said moment of time causing said inversion of said relationship.

8. An apparatus in accordance with claim 7, wherein said time interval for obtaining said time difference value has a value of about one-half said ratio.

9. An apparatus in accordance with claim 8, wherein said surface layer removal processing includes spraying an etchant onto said surface layer thereby to etch said surface layer.

* * * * *